United States Patent
Kim

(10) Patent No.: US 7,679,043 B2
(45) Date of Patent: *Mar. 16, 2010

(54) PERIPHERAL LIGHT SENSOR AND LIQUID CRYSTAL DISPLAY DEVICE USING THE SAME

(75) Inventor: Sang-uk Kim, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 132 days.

This patent is subject to a terminal disclaimer.

(21) Appl. No.: 11/849,859

(22) Filed: Sep. 4, 2007

(65) Prior Publication Data

US 2008/0149811 A1 Jun. 26, 2008

(30) Foreign Application Priority Data

Dec. 21, 2006 (KR) .................. 10-2006-0131859

(51) Int. Cl.
  *H03F 3/08* (2006.01)
(52) U.S. Cl. .................. 250/214 AL; 345/76
(58) Field of Classification Search ........... 250/214 AL; 345/76
See application file for complete search history.

(56) References Cited

U.S. PATENT DOCUMENTS 5,119,183 A  6/1992  Weisfield et al.
6,809,718 B2 * 10/2004 Wei et al. .................. 345/102
2004/0196240 A1  10/2004 Koyama et al.
2005/0023443 A1 * 2/2005 Fujita .................. 250/214 A
2005/0035932 A1 * 2/2005 Nishikawa et al. ........... 345/76
2005/0045806 A1 * 3/2005 Sakaguchi .............. 250/214 R
2007/0126697 A1 * 6/2007 Sato et al. .................. 345/156

FOREIGN PATENT DOCUMENTS

| JP | 2002-23658 A | 1/2002 |
| JP | 2006-251636 | 9/2006 |
| KR | 2003-0075317 | 9/2003 |
| KR | 10-2004-0079167 | 9/2004 |
| KR | 10-2006-0101011 A | 9/2006 |

OTHER PUBLICATIONS

Korean Patent Abstracts, Publication No. 1020040079167 A; Date of Publication: Sep. 14, 2004; in the name of Ok Hui Kim, et al.

(Continued)

*Primary Examiner*—Georgia Y Epps
*Assistant Examiner*—Kevin Wyatt
(74) *Attorney, Agent, or Firm*—Christie, Parker & Hale, LLP

(57) ABSTRACT

Disclosed are a peripheral light sensor and a liquid crystal display device using the same. The device includes: a peripheral light sensor including: one or more transistors each coupled between an output line and a ground power sources, and having a gate electrode coupled to the ground power source and a first electrode, a voltage value of the respective ground power source being less than a maximal voltage value supplied to the respective output line, wherein each of the transistors is configured to output to the respective outline line a peripheral light sensing signal corresponding to an intensity of a peripheral light.

11 Claims, 2 Drawing Sheets

OTHER PUBLICATIONS

Patent Abstracts of Japan for Publication No. 2002-023658, published on Jan. 23, 2002 in the name of Sumi Shinobu.
Korean Patent Abstracts for Publication No. 1020030075317 A, published on Sep. 26, 2003 in the name of Seung Hwan Mun.
Korean Patent Abstracts for Publication No. 1020060101011 A, published on Sep. 22, 2006 in the name of Sang Uk Kim.
Patent Abstracts of Japan, Publication No. 2006-251636, dated Sep. 21, 2006, in the name of Yasuyuki Matsui et al.

KIPO Office action dated Jan. 5, 2009, for Korean priority application 10-2006-0131857 for related U.S. Appl. No. 11/898,120, noting listed reference in this IDS, as well as KR 10-2006-0101011 and JP 2002-023658 previously filed in an IDS dated Aug. 6, 2008.

KIPO Office action dated Jun. 30, 2008, for Korean priority application 10-2006-0131857 for related U.S. Appl. No. 11/898,120, noting references previously filed in an IDS dated Aug. 6, 2008.

* cited by examiner

PERIPHERAL LIGHT SENSOR AND LIQUID CRYSTAL DISPLAY DEVICE USING THE SAME

CROSS-REFERENCE TO RELATED APPLICATIONS

This application claims the priority to and the benefit of Korean Patent Application No. 10-2006-0131859, filed on Dec. 21, 2006, in the Korean Intellectual Property Office, the entire content of which is incorporated herein by reference.

BACKGROUND

1. Field of the Invention

The present invention relates to a peripheral light sensor and a liquid crystal display device using the same, and more particularly to a peripheral light sensor and a liquid crystal display device, which improves output characteristics of the peripheral light sensor and reduces power consumption of the liquid crystal display device.

2. Discussion of Related Art

Recently, various flat panel display devices having reduced weight and volume as compared to cathode ray tubes (CRTS) have been developed. Flat panel displays include liquid crystal displays (LCDs), field emission displays (FEDs), plasma display panels (PDPs), and organic light emitting displays (OLEDs).

Since the LCD advantageously has a small size, a light weight, and low power consumption, it has been highlighted as a substitute of the cathode ray tube (CRT). At present, the LCD has been mounted in a monitor or middle to large-sized TV as well as portable devices such as portable phones and portable digital assistants (PDAs). An LCD is a penetrating type of display device, and adjusts an amount of light penetrating a liquid crystal layer by the refraction rate anisotropy of liquid crystal molecules to display desired images.

In the LCD, the back light emitter irradiates light of constant brightness to a pixel portion. However, although a large amount of light is not required for a higher degree of recognition because the brightness of ambient circumstance is dark, light of constant brightness is supplied to the pixel portion. This causes power consumption of the back light emitter to be increased. In practice, the back light emitter consumes greater than 80% of the power required to drive the LCD. Accordingly, to reduce power consumption, a peripheral light is sensed, and when the sensed peripheral light has a brightness less than a predetermined brightness, the amount of light generated by the back light emitter may be reduced.

Moreover, it is desirable to provide a method of improving output characteristics in order to cause a peripheral light sensing signal outputted from the peripheral light sensor to efficiently control a back light driver.

SUMMARY OF THE INVENTION

Accordingly, it is an aspect of one embodiment of the present invention to provide a peripheral light sensor and a liquid crystal display device using the same and that may improve output characteristics of the peripheral light sensor and reduce power consumption of the liquid crystal display device.

The foregoing and/or other aspects of one embodiment of the present invention may be achieved by providing a peripheral light sensor including: one or more transistors each coupled between an output line and a ground power source, and having a gate electrode coupled to the ground power source and a first electrode, a voltage value of the ground power source being less than a maximal voltage value supplied to the output line, wherein each of the transistors is configured to output to the output line a peripheral light sensing signal corresponding to an intensity of a peripheral light.

In one embodiment, the peripheral light sensor also includes a pulse wave signal that is configured to vary between a first voltage having a first voltage value and a second voltage having a second voltage value supplied to the output line of the peripheral light sensor, the second voltage value being greater than the first voltage value. In one embodiment, the first voltage value is set to be approximately equal to the voltage value of the ground power source, and the voltage value of the second voltage is set to be greater than that of a voltage value of a ground power. In one embodiment, each of the one or more transistors is configured to control a current amount that flows to the first electrode from a second electrode, the current amount corresponding to the intensity of the peripheral light inputted to the gate electrode.

In one embodiment of the present invention, a liquid crystal display device is provided. The device includes: a pixel portion including a plurality of liquid crystal cells; at least one peripheral light sensor positioned at a black matrix region, the black matrix region being formed at a peripheral region of the pixel portion, the peripheral light sensor configured to output a peripheral light sensing signal corresponding to an intensity of a peripheral light; a back light emitter configured to supply light to the pixel portion; and a back light driver for controlling a luminance of the light supplied by the back light emitter, wherein the luminance of the light corresponds to the peripheral light sensing signal, wherein the peripheral light sensor includes at least two transistors coupled to each other in parallel between an output line and a ground power source, each of the transistors having a gate electrode coupled to the ground power source and a first electrode, a voltage value of the ground power source being less than a maximal value of a voltage supplied to the output line.

In one embodiment, each gate electrode is disposed at an opening portion of the black matrix region. In one embodiment, a pulse wave signal configured to vary between a first voltage having a first voltage value and a second voltage having a second voltage value is supplied to the output line of the peripheral light sensor, the second voltage value being greater than the first voltage value. In one embodiment, the transistors are configured to control a current amount that flows to the first electrode from a second electrode, the current amount corresponding to the intensity of the peripheral light being inputted to the gate electrode.

In one embodiment of the present invention, a liquid crystal display device is provided. The device includes: a pixel portion having a plurality of liquid crystal cells; a peripheral light sensor including one or more transistors, each of the one or more transistors being coupled between an output line and a ground power source and having a gate electrode coupled to the ground power source and a first electrode, a voltage value of the ground power source being less than a maximal voltage value supplied to the output line, wherein each of the transistors is configured to output to the output line a peripheral light sensing signal corresponding to an intensity of a sensed peripheral light; a back light driver configured to receive the peripheral light sensing signal and output a drive signal have a value corresponding to the intensity of the sensed peripheral light; and a back light emitter configured to receive the drive signal and supply a light to the pixel portion, the light having a luminance corresponding to the value of the drive signal.

In one embodiment of the liquid crystal display device, the drive signal output by the back light driver is a first value when the sensed peripheral light is a first intensity and the drive signal output by the back light driver is a second value when the sensed peripheral light is a second intensity, the first value being greater than the second value when the first intensity is greater than the second intensity. In one embodiment of the liquid crystal display device, the drive signal output by the back light driver is a first value when the sensed peripheral light is a first intensity and the drive signal output by the back light driver is maintained at substantially the first value when a second intensity of the sensed peripheral light is equal to or above a threshold.

BRIEF DESCRIPTION OF THE DRAWINGS

These and/or other aspects and advantages of the invention will become apparent and more readily appreciated from the following description of some embodiments, taken in conjunction with the accompanying drawings of which.

DETAILED DESCRIPTION OF EMBODIMENTS

Figure 1:
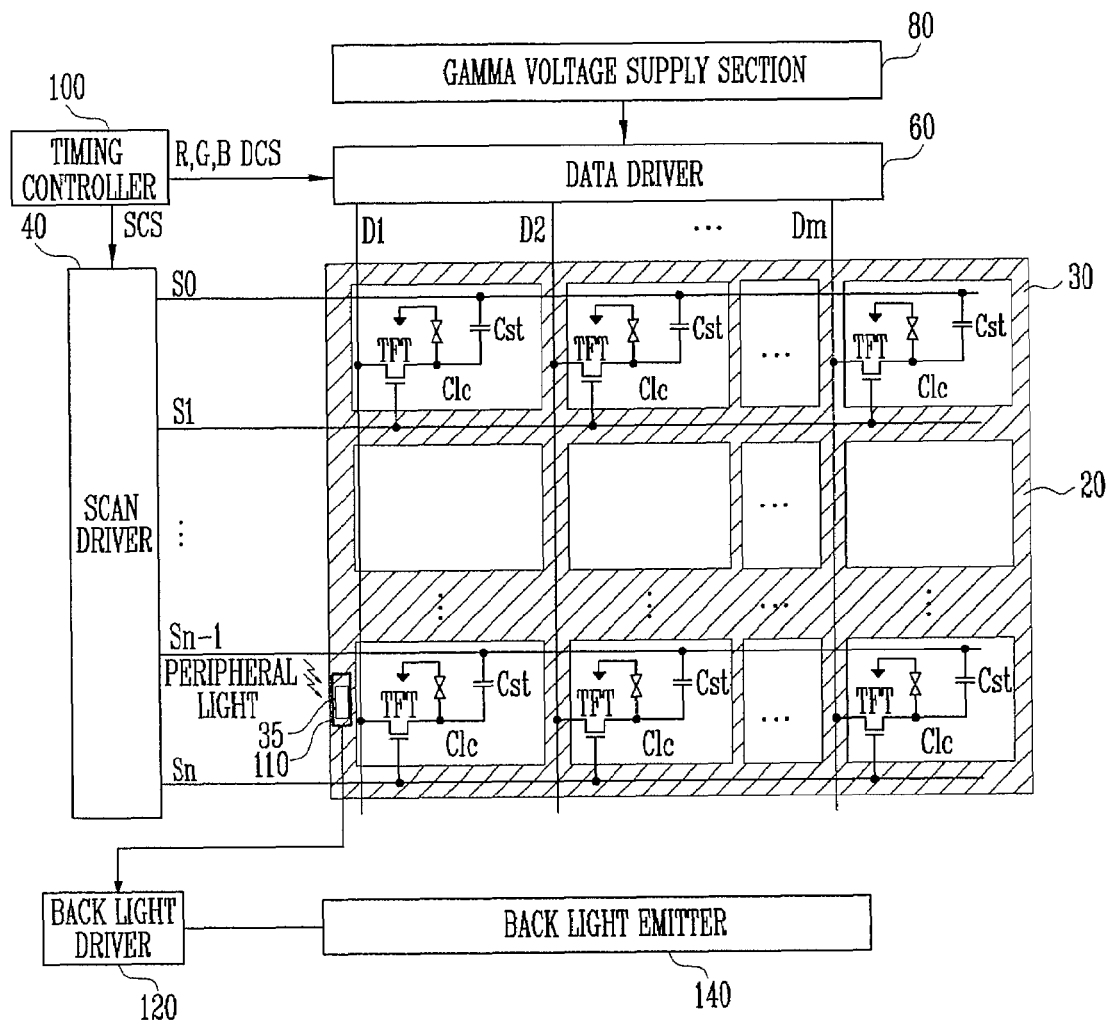
FIG. 1 is a view showing a liquid crystal display device according to one embodiment of the present invention.

Hereinafter, embodiments according to the present invention will be described with reference to the accompanying drawings, namely, FIGS. 1, 2 and 3. Here, when one element is coupled to another element, one element may be not only directly coupled to another element but also indirectly coupled to another element via another element. Further, irrelative elements are omitted for clarity. Also, like reference numerals refer to like elements throughout.

FIG. 1 is a view showing a liquid crystal display device according to one embodiment of the present invention. Although FIG. 1 shows an active matrix liquid crystal display device, the present invention is not limited thereto.

With reference to FIG. 1, the liquid crystal display device according to one embodiment of the present invention includes a pixel portion 20, a scan driver 40, a data driver 60, a gamma voltage supply section 80, a timing controller 100, peripheral light sensor 110 for detecting peripheral light, a back light driver 120, and a back light emitter 140. The peripheral light sensor 110 is formed in at least one region of a black matrix 30, which is formed at a peripheral portion of the pixel portion 20. An opening portion 35 is formed in the black matrix 30. Peripheral light may be incident on the region of the peripheral light sensor 110 through the opening portion 35. When the peripheral light is incident on the peripheral light sensor 110, the peripheral light sensor 110 generates a peripheral light sensing signal corresponding to an intensity of the peripheral light in order to control the back light driver 120.

The pixel portion 20 includes a plurality of liquid crystal cells Clc, wherein each of the liquid crystal cells has at least one thin film transistor (TFT) and a storage capacitor Cst. The plurality of liquid crystal cells Clc are arranged at intersections of the data lines D1 to Dm and scan lines S1 through Sn. Each thin film transistor TFT is formed at the liquid crystal cell Clc. The TFT provides a data signal supplied from the data line D to the liquid crystal cell Clc corresponding to a scan signal. The storage capacitor Cst is formed between a pixel electrode of the liquid crystal cell Clc and a scan line S of a previous state or between a pixel electrode of the liquid crystal cell Clc and a common electrode line to maintain a constant voltage of the liquid crystal cell Clc during one frame. Accordingly, when the scan signal is supplied to the scan line S, an angle of a liquid crystal changes in correspondence to the data signal. A light transmittance changes according to a change of the angle in order to display a desired image. A black matrix 30 is formed between the liquid crystal cells Clc and a peripheral portion of the pixel portion 20 to absorb light incident from an adjacent liquid crystal cell or from a peripheral portion of the pixel portion 20 and thereby may prevent the contrast from being deteriorated.

The scan driver 40 sequentially provides the scan signal to the scan lines S1 through Sn. The scan signal is provided corresponding to a scan control signal SCS supplied from the timing controller 100 in order to select a line of the pixel portion 20 to which the data signal is supplied.

The data driver 60 converts digital video data R, G, and B into an analog gamma voltage corresponding to a data control signal DCS supplied from the timing controller 100, that is, a data signal, and provides the data signal to the data lines D1 to Dm.

The gamma voltage supply section 80 supplies a plurality of gamma voltages to the data driver 60.

The timing controller 100 generates a scan control signal SCS and a data control signal DCS to control the scan driver 40 and the data driver 60, respectively, by using vertical and horizontal synchronous signals, Vsync and Hsync, respectively, and by using a clock signal CLK (not shown) that is from a location outside of the device. Here, the scan control signal SCS for controlling the scan driver 40 includes a gate start pulse, a gate shift clock, and a gate output signal. The data control signal DCS for controlling the data driver 60 includes a source start pulse, a source shift clock, a source output signal, and a polarity signal. Further, the timing controller 100 rearranges data R, G, and B supplied from a location outside of the device and provides them to the data driver 60.

The peripheral light sensor 110 is formed in at least one region of the black matrix 30, which is formed at a peripheral portion of the pixel portion 20. Here, at least one region of the peripheral light sensor 110, particularly, a region receiving peripheral light, is disposed at an opening portion of the black matrix 30. Accordingly, at least one region of the peripheral light sensor 110 is exposed to the peripheral light. This causes the peripheral light to be incident on the peripheral light sensor 110. The peripheral light sensor 110 having received the peripheral light generates and provides a peripheral light sensing signal corresponding to an intensity of the peripheral light. The peripheral light sensing signal is provided to the back light driver 120, thereby controlling the back light driver 120.

The back light driver 120 supplies a drive voltage (or current) to the back light emitter 140. The drive voltage (or current) is supplied for driving the back light emitter 140. The back light driver 120 changes a value of the drive voltage (or current) corresponding to the peripheral light sensing signal supplied from the peripheral light sensor 110 in order to control the luminance of the light generated in the back light emitter 140. For example, when the back light driver 120 receives a sensing signal corresponding to a peripheral light of a low intensity, the back light driver 120 reduces the drive voltage (or current) of the back light emitter by a predetermined value corresponding to the intensity of the peripheral light in order to reduce the luminance of light generated in the back light emitter 140. Accordingly, power consumption may be reduced. In contrast to this, if the back light driver 120 receives the peripheral light sensing signal corresponding to the peripheral light having an intensity greater than a predetermined intensity, the back light driver 120 does not change an amplitude of the drive voltage (or current) of the back light emitter 140 so as to not reduce the luminance of the light generated in the back light emitter 140. Accordingly, preventing luminous characteristics of the pixel portion 20 may be prevented from being deteriorated.

While FIG. 1 shows one peripheral light sensor 110, the present invention is not limited thereto. For example, a plurality of peripheral light sensors 110 may be arranged at the black matrix region 30. That is, the number of peripheral light sensors 110 can be variously set. For example, the number can be one.

The back light emitter 140 generates light corresponding to a drive voltage (or current) supplied from the back light driver 120 and supplies the light to the pixel portion 20.

In the liquid crystal display device according to the embodiment of the present invention as described above, the liquid crystal display device includes a peripheral light sensor 110 to sense an intensity of a peripheral light to control the luminance of light generated in the back light emitter based on the sensed intensity of the peripheral light. Accordingly, power consumption can be reduced.

Furthermore, when it is sensed that the intensity of the peripheral light is equal to or greater than a predetermined value, it does not reduce the luminance of light generated in the back light emitter 140, therefore luminous characteristics of the pixel portion 20 may be prevented from being deteriorated.

Figure 2:
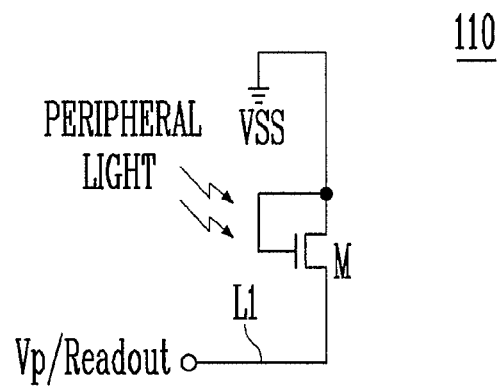
FIG. 2 is a view showing one embodiment of a peripheral light sensor shown in FIG. 1.

FIG. 2 is a view showing one embodiment of a peripheral light sensor for detecting peripheral light shown in FIG. 1.

The peripheral light sensor 110 includes a transistor M, which is coupled between an output line L1 and a ground power source VSS. The peripheral light sensing signal is outputted through the output line L1.

More particularly, a first electrode of the transistor M is coupled to a ground power source VSS set by a ground GND voltage, and a second electrode thereof is coupled to an output line L1. Here, the first electrode and the second electrode are different from each other. For example, when the first electrode is a source electrode, the second electrode is a drain electrode. Further, the output line L1 senses amplitude of an electric current flowing to the peripheral light sensor 110 and receives a pulse wave signal Vp. For example, the output line L1 receives a pulse wave signal Vp configured to vary between a first voltage and a second voltage, and senses the amplitude of an electric current flowing through the optical sensing transistor M. In this embodiment, the first voltage is a ground voltage while the second voltage has a value greater than the ground voltage.

Moreover, a gate electrode of the transistor M is coupled at a first electrode and the ground power source VSS. That is, a gate electrode of the transistor M is coupled to a first electrode so that the transistor M is reversely diode-coupled. The first electrode receives a voltage less than that of a second electrode. The gate electrode of the transistor M is disposed at an opening portion 35 of the black matrix 30, and receives a peripheral light.

When the peripheral light is incident on the gate electrode of the transistor M and a pulse wave signal Vp is supplied to the second electrode, the transistor M flows an electric current corresponding to an intensity of a peripheral light. That is, an electric current corresponding to an intensity of the peripheral light flows from the second electrode to the first electrode.

Accordingly, the same electric current as that flowing through the transistor M flows through the output line L1. The peripheral light sensor 110 reads out the electric current to sense an intensity of the peripheral light. Accordingly, the electric current flowing through the output line L1 of the peripheral light sensor 110 can be set as a peripheral light sensing signal.

In the peripheral light sensor 110 shown in FIG. 2, the transistor M is reversely diode-coupled so that an electric current corresponding to an intensity of the peripheral light is linearly changed to reliably sense the peripheral light.

However, when the peripheral light sensor 110 is embodied by one transistor M, an electric current outputted to the output line L1 of the peripheral light sensor 110 may be too small to effectively control the back light driver 120.

For example, while forming TFTs of the pixel portion 20, when the transistor M of the peripheral light sensor 110 is formed by a similar size, because an internal resistance of the transistor M can be large, an output current value can be small.

Figure 3:
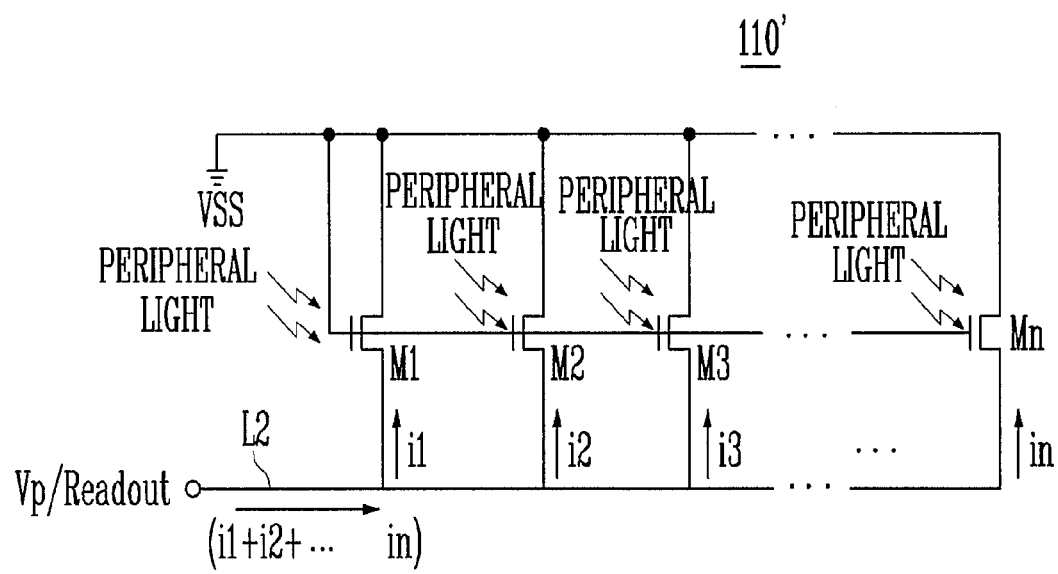
FIG. 3 is a view showing another embodiment of the peripheral light sensor shown in FIG. 1.

Accordingly, since the present invention may generate a relatively large output current that can control the back light driver 120 through the peripheral light sensor shown in FIG. 3, and includes a special amplifier circuit, it provides one embodiment the peripheral light sensor 110 that may have a relatively easy process and a design.

FIG. 3 is a view showing another embodiment of the peripheral light sensor for detecting peripheral light shown in FIG. 1.

With reference to FIG. 3, the peripheral light sensor 110' includes at least two transistors M1 to Mn, which are coupled to each other in parallel between an output line L2 and a ground power source VSS. A peripheral light sensing signal is outputted through the output line L2.

More particularly, first electrodes of the transistors M1 to Mn are coupled to the ground power source VSS, and second electrodes thereof coupled to an output line L2 of the peripheral light sensor 110'. Gate electrodes of the transistors M1 to Mn are coupled to first electrodes thereof and the ground power source VSS. Accordingly, the transistors M1 to Mn are coupled to each other in parallel, and respective transistors M1 through Mn are reverse diode-coupled.

Here, gate electrodes of the transistors M1 to Mn are positioned at an opening portion 35 of the black matrix 30 to receive a peripheral light. That is, in this case, a plurality of opening portions 35 can be formed at the black matrix 30.

Further, the output line L2 of the peripheral light sensor 110' receives a pulse wave signal Vp configured to vary between a first voltage and a second voltage. In this embodiment, the first voltage is a ground voltage of approximately 0 volts while the second voltage has a value of 2V, which is greater than the ground voltage. Accordingly, in one embodiment, maximal voltage value of the pulse wave signal Vp is set to be greater than that of the ground power source VSS.

When the peripheral light is incident on the gate electrodes of the transistors M1 to Mn and a pulse wave signal Vp is supplied through the output line L2, each transistor M2 controls an amount of an electric current flowing from a first electrode to a second electrode corresponding to an intensity of a peripheral light, which is incident on the gate electrode thereof.

Accordingly, an electric current (i1+i2+, . . . +in) is a sum of electric currents i1 through in that the transistors M1 to Mn flow to the output line L2 of the peripheral light sensor 110'.

Since at least two, or, more generally, a plurality of transistors M1 to Mn are coupled to each other in the peripheral light sensor 110' in parallel, an electric current greater in comparison with the case of forming single transistors M1 to Mn having the same size, flows through the output line L2 of the peripheral light sensor 110'.

Accordingly, the present invention increases an electric current, namely, an amplitude of the peripheral light sensing signal flowing to the output line L2 of the peripheral light sensor 110' without an additional amplifier circuit in order to enhance output characteristics of the peripheral light sensor 110'. Consequently, a peripheral light sensor 110' having easy process and design and improved output characteristics can be provided.

Moreover, when a size of a single transistor is increased not to improve output characteristics, and a plurality of transistors M1 to Mn are coupled to each other in parallel to improve the output characteristics, a size of a light incident section can be reduced in comparison with an peripheral light sensor including a single large transistor M having the same output characteristics, and the light incident section can be dispersed. Accordingly, this prevents the recognition of the peripheral light sensor 110' by a user's eyes.

While FIG. 2 and FIG. 3 show an N-type transistor M, the present invention is not limited thereto. For example, a P-type transistor can be used.

As is seen from the forgoing description, in the peripheral light sensor and a liquid crystal display device using the same according to the present invention, an electric current flowing to an output line of a peripheral light sensor and the amplitude of a peripheral light sensing signal may be increased in order to improve output characteristics of the peripheral light sensor. Consequently, a peripheral light sensor having easy process and design and improved output characteristics can be provided.

In addition, by using the peripheral light sensor, an intensity of a peripheral light is reliably sensed to control luminance light generated in the back light, and power consumption may be reduced.

Although embodiments of the present invention have been shown and described, it would be appreciated by those skilled in the art that changes might be made in these embodiments without departing from the principles and spirit of the invention, the scope of which is defined by the claims and their equivalents.

What is claimed is:

1. A peripheral light sensor comprising:
    at least two transistors coupled to each other in parallel between an output line and a ground power source, each of the transistors having a gate electrode coupled to the ground power source and a first electrode, a voltage value of the ground power source being less than a maximal value of a voltage supplied to the output line, wherein each of the transistors is configured to output to the output line a peripheral light sensing signal corresponding to an intensity of a peripheral light.

2. The peripheral light sensor as claimed in claim 1, wherein a pulse wave signal configured to vary between a first voltage having a first voltage value and a second voltage having a second voltage value is supplied to the output line of the peripheral light sensor, the second voltage value being greater than the first voltage value.

3. The peripheral light sensor as claimed in claim 2, wherein the first voltage value is set to be approximately equal to the voltage value of the ground power source, and the voltage value of the second voltage is set to be greater than that of the voltage value of the ground power source.

4. The peripheral light sensor as claimed in claim 1, wherein each of the one or more transistors is configured to control an amount of current that flows to the first electrode from a second electrode, the amount of current corresponding to the intensity of the peripheral light incident on the gate electrode.

5. A liquid crystal display device comprising:
    a pixel portion including a plurality of liquid crystal cells;
    at least one peripheral light sensor positioned at a black matrix region, the black matrix region being formed at a peripheral region of the pixel portion, the peripheral light sensor configured to output a peripheral light sensing signal corresponding to an intensity of a peripheral light;
    a back light emitter configured to supply light to the pixel portion; and
    a back light driver for controlling a luminance of the light supplied by the back light emitter,
        wherein the luminance of the light corresponds to the peripheral light sensing signal, and
        wherein the peripheral light sensor includes at least two transistors coupled to each other in parallel between an output line and a ground power source, each of the transistors having a gate electrode coupled to the ground power source and a first electrode, a voltage value of the ground power source being less than a maximal value of a voltage supplied to the output line.

6. The liquid crystal display device as claimed in claim 5, wherein each gate electrode is disposed at an opening portion of the black matrix region.

7. The liquid crystal display device as claimed in claim 5, wherein a pulse wave signal configured to vary between a first voltage having a first voltage value and a second voltage having a second voltage value is supplied to the output line of the peripheral light sensor, the second voltage value being greater than the first voltage value.

8. The liquid crystal display device as claimed in claim 5, wherein the transistors are configured to control an amount of current that flows to the first electrode from a second electrode, the amount of current corresponding to the intensity of the peripheral light incident on the gate electrode.

9. A liquid crystal display device comprising:
    a pixel portion having a plurality of liquid crystal cells;
    a peripheral light sensor comprising at least two transistors coupled to each other in parallel between an output line and a ground power source, each of the transistors having a gate electrode coupled to the ground power source and a first electrode, a voltage value of the ground power source being less than a maximal value of a voltage supplied to the output line, wherein each of the transistors is configured to output to the output line a peripheral light sensing signal corresponding to an intensity of a sensed peripheral light;
    a back light driver configured to receive the peripheral light sensing signal and output a drive signal have a value corresponding to the intensity of the sensed peripheral light; and
    a back light emitter configured to receive the drive signal and supply a light to the pixel portion, the light having a luminance corresponding to the value of the drive signal.

10. The liquid crystal display device as claimed in claim 9, wherein the drive signal output by the back light driver is a first value when the sensed peripheral light is a first intensity and the drive signal output by the back light driver is a second value when the sensed peripheral light is a second intensity, the first value being greater than the second value when the first intensity is greater than the second intensity.

11. The liquid crystal display device as claimed in claim 9, wherein the drive signal output by the back light driver is a first value when the sensed peripheral light is a first intensity and the drive signal output by the back light driver is maintained at substantially the first value when a second intensity of the sensed peripheral light is equal to or above a threshold.

* * * * *